(12) United States Patent
Sallee et al.

(10) Patent No.: US 12,172,632 B2
(45) Date of Patent: *Dec. 24, 2024

(54) SYSTEM AND METHOD FOR REDUCING VEHICLE TURNING RADIUS

(71) Applicant: Ford Global Technologies, LLC, Dearborn, MI (US)

(72) Inventors: Kevin Sallee, Ferndale, MI (US); Michael Edward Brewer, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,540

(22) Filed: May 12, 2023

(65) Prior Publication Data

US 2023/0278543 A1 Sep. 7, 2023

Related U.S. Application Data

(63) Continuation of application No. 17/015,464, filed on Sep. 9, 2020, now Pat. No. 11,685,367.

(51) Int. Cl.
*B60W 30/045* (2012.01)
*B60W 10/18* (2012.01)
*B60W 40/105* (2012.01)
*B60W 40/114* (2012.01)

(52) U.S. Cl.
CPC ......... *B60W 30/045* (2013.01); *B60W 10/18* (2013.01); *B60W 40/105* (2013.01); *B60W 40/114* (2013.01); *B60W 2510/12* (2013.01); *B60W 2510/20* (2013.01); *B60W 2520/10* (2013.01); *B60W 2520/14* (2013.01); *B60W 2520/26* (2013.01); *B60W 2520/28* (2013.01)

(58) Field of Classification Search
CPC ............ B60W 30/045; B60W 10/184; B60W 10/188; B60W 10/08; B60W 50/085; B60T 8/17616; B60T 8/172; B60T 1/093; B60T 13/586; B60T 7/122; B60L 7/26; B60L 15/2036; B62D 11/08; B60K 7/0007; B60K 17/348

See application file for complete search history.

(56) References Cited

U.S. PATENT DOCUMENTS

| | | | | |
|---|---|---|---|---|
| 4,042,059 A * | 8/1977 | Bertolasi | ................ | B60T 8/172 180/197 |
| 4,696,365 A * | 9/1987 | Ishimori | .............. | B60K 17/348 180/338 |
| 7,229,139 B2 | 6/2007 | Lu et al. | | |
| 7,677,095 B1 * | 3/2010 | Bartol | ................ | B60T 8/17616 73/146.2 |
| 7,979,189 B2 * | 7/2011 | Nihei | .................. | B60W 10/184 180/197 |

(Continued)

*Primary Examiner* — Yuri Kan
(74) *Attorney, Agent, or Firm* — Burr & Forman LLP; Lorne Forsythe

(57) ABSTRACT

A method of providing automated application of turn radius reduction in a driver assist mode may include receiving steering wheel angle and wheel speed information to determine a target wheel slip during a turn. The method may further include comparing the target wheel slip to a current wheel slip to determine a slip error, and applying braking torque to an inside wheel based on the slip error to reduce the turn radius.

19 Claims, 6 Drawing Sheets

(56) References Cited

U.S. PATENT DOCUMENTS

| | | | | |
|---|---|---|---|---|
| 11,685,367 B2* | 6/2023 | Sallee | | B60W 30/045 |
| | | | | 701/82 |
| 2005/0236894 A1* | 10/2005 | Lu | | B62D 11/08 |
| | | | | 303/139 |
| 2006/0260859 A1* | 11/2006 | Kasten | | B60L 15/2036 |
| | | | | 180/247 |
| 2008/0120003 A1* | 5/2008 | Nihei | | B60W 10/08 |
| | | | | 701/69 |
| 2008/0195289 A1* | 8/2008 | Sokoll | | B60T 7/122 |
| | | | | 701/70 |
| 2013/0065728 A1* | 3/2013 | Eisele | | B60T 13/586 |
| | | | | 180/65.265 |
| 2013/0162009 A1* | 6/2013 | Mitts | | B60L 7/26 |
| | | | | 303/3 |
| 2020/0047738 A1* | 2/2020 | Zimmerman | | B60W 10/188 |
| 2020/0172062 A1* | 6/2020 | Hanslik | | B60T 1/093 |
| 2022/0219676 A1* | 7/2022 | Cao | | B60K 7/0007 |

* cited by examiner

SYSTEM AND METHOD FOR REDUCING VEHICLE TURNING RADIUS

CROSS-REFERENCE TO RELATED APPLICATIONS

This application is a continuation of U.S. application Ser. No. 17/015,464, filed Sep. 9, 2020, which is expressly incorporated by reference herein in its entirety.

TECHNICAL FIELD

Example embodiments generally relate to vehicle control technology and, more particularly, relate to a system and method for providing a reduced vehicle turning radius.

BACKGROUND

Navigating off-road terrain, or rugged trails, can sometimes cause the driver to encounter turns that require a turning radius that is smaller than the vehicle is capable of delivering. This may cause the driver to have to perform a three point turn or multiple maneuvers to make the turn. The multiple maneuvers may include changing direction between forward and reverse directions along with turning the steering wheel from lock-to-lock within a tight confined space in order to orient the vehicle so that it can continue along the trail or intended path.

Limiting parameters for the vehicle, such as maximum possible road wheel angle, wheel base, and track width, may create these limitations on vehicle turning capabilities. These parameters are fixed at the time of manufacturing for each vehicle, and generally represent correspondingly fixed limitations that cannot be overcome. However, it is known that applying brake torque to an inside wheel during a turn can reduce the turning radius. In this regard, U.S. Pat. No. 7,229,139, the entire contents of which are incorporated herein by reference, discloses a method of reducing turning radius based on steering wheel angle, steering wheel direction, steering wheel angle rate to increase parkability of larger vehicles by reducing their turning radius.

Nevertheless, it may be desirable to extend the effectiveness and utility of turning radius reduction that can be implemented automatically when enabled by the driver to provide a more satisfying user experience.

BRIEF SUMMARY OF SOME EXAMPLES

In accordance with an example embodiment, a vehicle control system for a vehicle may be provided. The system may include a controller and a torque control module. The controller may be operably coupled to components and/or sensors of a vehicle to receive information including vehicle wheel speed and steering wheel angle. The controller may be configured to determine a target wheel slip for a turn based on the information. The torque control module may be configured to compare the target wheel slip to a current wheel slip and control application of braking torque to an inside wheel during the turn to reduce the turn radius based on a difference between the current wheel slip and the target wheel slip.

In another example embodiment, torque control module of a vehicle control system may be provided. The torque control module may include a braking table and processing circuitry. The braking table may be configured to define a braking torque to be applied to a braking system based on a slip error defining a difference between a target wheel slip and a current wheel slip measured during a turn. The processing circuitry may be configured to compare the target slip to the current slip to define the slip error, and to control application of the braking torque to an inside wheel during the turn to reduce a turn radius of the vehicle based on the slip error.

In another example embodiment, a method of providing automated application of turn radius reduction in a driver assist mode is described. The method may include receiving steering wheel angle and wheel speed information to determine a target wheel slip during a turn. The method may further include comparing the target wheel slip to a current wheel slip to determine a slip error, and applying braking torque to an inside wheel based on the slip error to reduce the turn radius.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
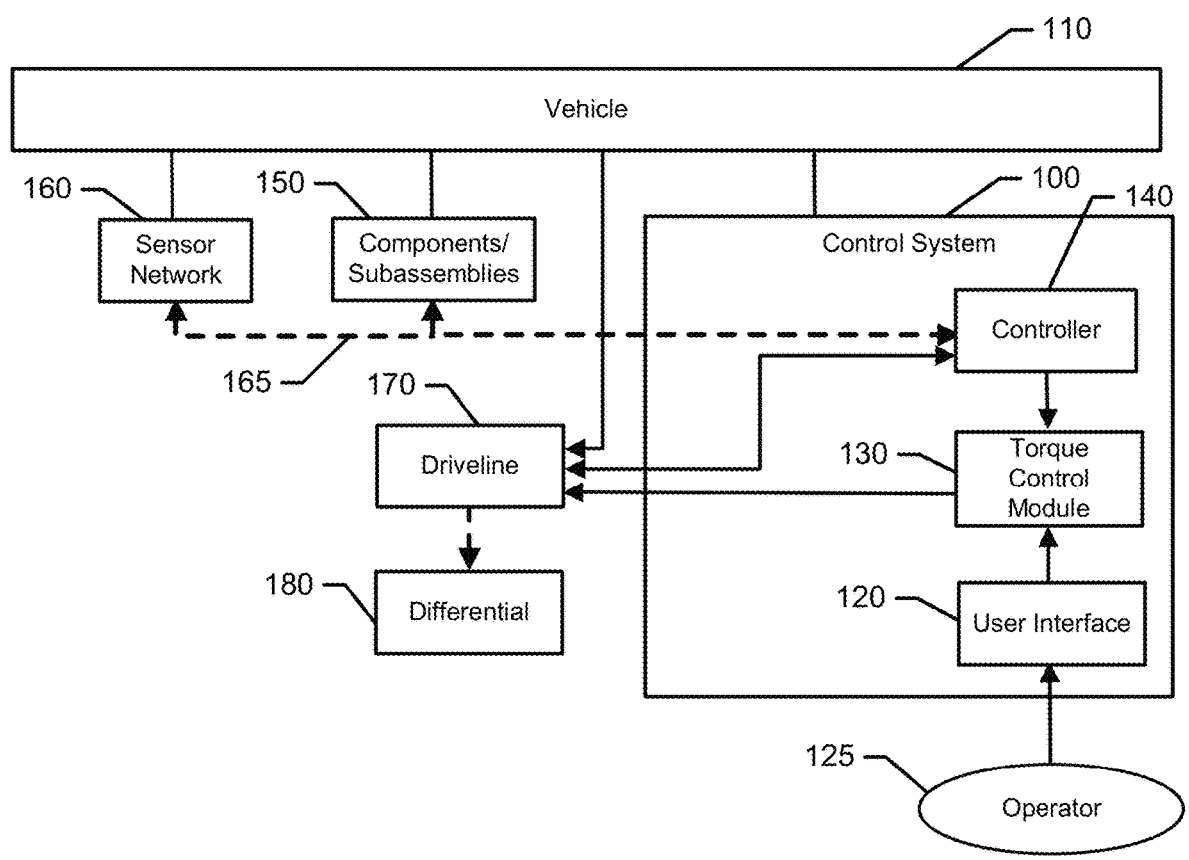
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

The application of brake torque to assist in turning radius reduction may be referred to as brake-steer, or brake-assisted turning. As noted above, it may be desirable to provide a system capable of implementing brake-steer by applying brake torque to at least one inside wheel during a turn in order to reduce the vehicle turning radius. Example embodiments are aimed at providing solutions for applying this basic function, but also answering questions as to when and how to apply brake torque.

Some example embodiments may therefore provide a system that is not only capable of providing such reductions in vehicle turning radius, but is further capable of doing so in an automatic fashion. In this regard, for example, when enabled by the driver, a controller of the system of example embodiments may be configured to automatically apply brake torque to one or both inside wheels. The application of such brake torque may be determined based on wheel slip, which is a measure of the difference in speed between certain wheels. In this case, wheel slip may be determined for one or both inside wheels relative to an average wheel speed of the outside wheels (or all three other wheels if calculated for a single wheel) for a given turn. Example embodiments may be configured to determine a target wheel slip (or target slip) for a given turn, measure current wheel slip (or current slip) to determine a difference value (e.g., slip error or error signal) between the target and current slips, and then apply brake torque to one or more inside wheels in order to reduce the slip error to zero.

Some example embodiments may further enable automated application of brake torque to be conditioned on the state of the driveline, or more specifically on the state of the differential (e.g., engaged or disengaged). As such, example embodiments may be configured to determine the state of the differential (or confirm the differential is in the disengaged state) prior to enabling slip-based turning control. Example embodiments may also introduce various correction factors into slip error calculations in order to enable further refinement of the control applied and/or may monitor the effectiveness of brake-steer implementation in real time in order to ensure that desired results are being achieved. As such, some example embodiments may provide an improved system for vehicle control that can yield benefits in both customer confidence and vehicle capability. As a result, vehicle performance and driver satisfaction may also be improved.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals and the steering wheel (or hand wheel). The pedals may include a brake pedal and an accelerator pedal pivotally mounted to the floor of the vehicle 110, and operable by an operator 125. The brake pedal may generally be used to provide inputs for control of braking torque, and the accelerator pedal may be used to provide inputs for control of propulsive torque. However, the normal mode of operation may not be desirable for all cases. Moreover, selectable other modes of operation, including one or more off-road driver assistance modes, parking modes, etc., may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include a trail control mode, or off-road driver assistance mode, in which selective brake-steering may be initiated as described in greater detail below.

Of note, although the term off-road driver assistance mode will generally be referred to herein as being the mode in which example embodiments are performed, the name of the mode in which example embodiments may be applied is not important, and certainly not limiting. As noted above, other terms like brake-steering mode, trail control mode, parking mode, or any other mode in which the functionality described herein is applied, are also possible.

The control system 100 of example embodiments may also include the torque control module 130, which may be part of or otherwise operably coupled to a controller 140. The torque control module 130 may be configured to determine propulsive torque and/or brake torque to be applied to the wheels, individually, in pairs or collectively (e.g., depending on driveline state) as described herein based on inputs from any or all of the controller 140, the user interface 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, the steering wheel of the vehicle, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. In some cases, the brake assembly may include an electric brake boost (EBB) system, which uses electric brake boosters to sense driver input and reduce the amount of pedal pressure needed for braking. The propulsion system may include a gas engine, electric motor, or any other suitable propulsion device.

The controller 140 and/or torque control module 130 may be configured to determine propulsive torque inputs for provision to the propulsion system to apply propulsive torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, vehicle acceleration, individual wheel speeds, front/rear wheel speeds, vehicle pitch, etc. Other examples of the components or subassemblies 150 and/or corresponding sensors of the sensor network 160 may provide information relating to yaw, lateral G force, steering wheel angle, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 (e.g., based on mode selection, steering wheel angle, speed, etc.) relative to control of various aspects of operation of the vehicle 110 and then be configured to use the information received in association with the execution of one or more control algorithms that may be used to provide instructions to the torque control module 130 in order to control application of torque to the wheels of the wheel assembly of the vehicle 110.

In an example embodiment, the operator 125 may use the user interface 120 to select the off-road driver assistance mode. The user interface 120 may be embodied by an interactive display in the vehicle 110, and may therefore be a soft switch provided on the display. However, in other examples, the user interface 120 may include a hard switch, a button, key, or other selectable operator located in the cockpit of the vehicle 110. Selection of the off-road driver assistance mode may correspondingly activate the torque control module 130 to provide the automated turning control described herein based on information provided by the components or subassemblies 150 and/or corresponding sensors of the sensor network 160. More specifically, selection of the off-road driver assistance mode based on the error measured between the current slip and the target slip. Operation of the torque control module 130 will be described in greater detail below in reference to FIG. 2.

As noted above, when the torque control module 130 is active, and automated turning controls have been activated, it may also be desirable to determine (or confirm) the driveline state. The controller 140 may therefore receive information to enable the controller 140 to determine a state of a driveline 170 of the vehicle 110. In this regard, for example, the driveline 170 may include front and rear axles, drive components for the front and rear axles and/or the components that provide coupling therebetween. Thus, for example, the driveline 170 may include a differential 180 (e.g., rear differential) and gears and/or clutch components that operably couple the front and rear axles (and/or their driving components). In certain situations, changes in drive state (e.g., between 2-High, 4-High, 4-Auto, etc.), may be accomplished by operating components of the driveline 170.

Some vehicles may include locking differentials. For a vehicle with a locking differential, it may be necessary to ensure that the differential is in an unlocked or disengaged state prior to brake-steering being implemented to avoid damage to the driveline 170. While some vehicles may include sensors dedicated to determining the state of the differential 180, other vehicles may not include such dedicated sensors. To ensure that a state of the differential 180 can be determined prior to the initiation of brake-steering (i.e., uneven braking to control wheel slip in accordance with example embodiments), the controller 140 of some example embodiments may be configured to automatically (and passively) determine the state of the differential 180 prior to initiating any brake-steering as described herein.

Figure 2:
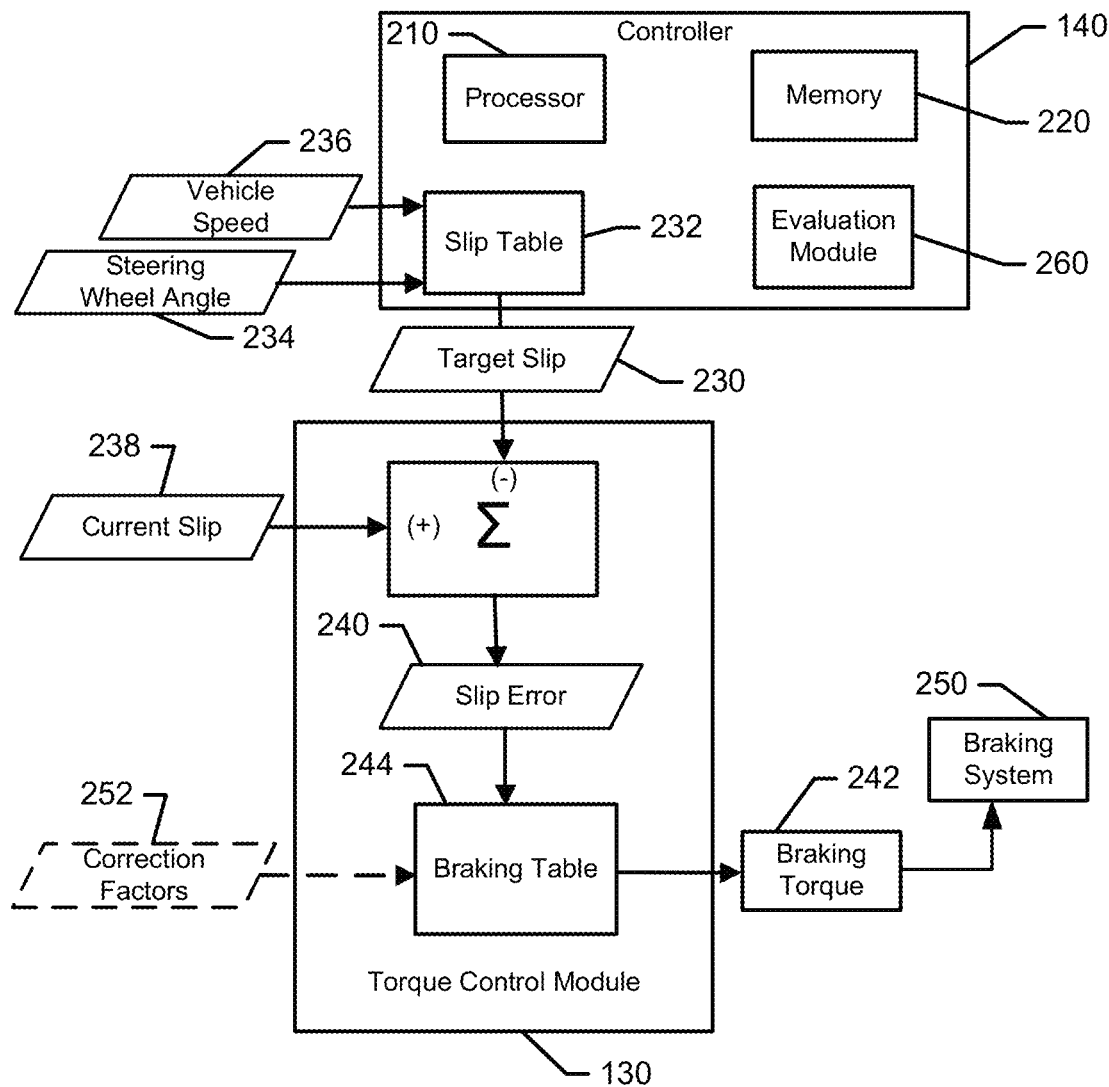
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of torque applied at the wheels of the vehicle 110 (e.g., individually or in pairs). The torque control module 130 may itself be a control algorithm, or may include control algorithms in the form of functional modules (or sub-modules) configured to perform specific functions for which they are configured relating to control of the vehicle 110 in the manner described herein. Thus, for example, the controller 140 may actually function as the torque control module 130 responsive to executing the control algorithms. However, in other cases, the torque control module 130 may be a component or module of the controller 140, or an entirely separate component (e.g., including its own corresponding processing circuitry).

Figure 3:
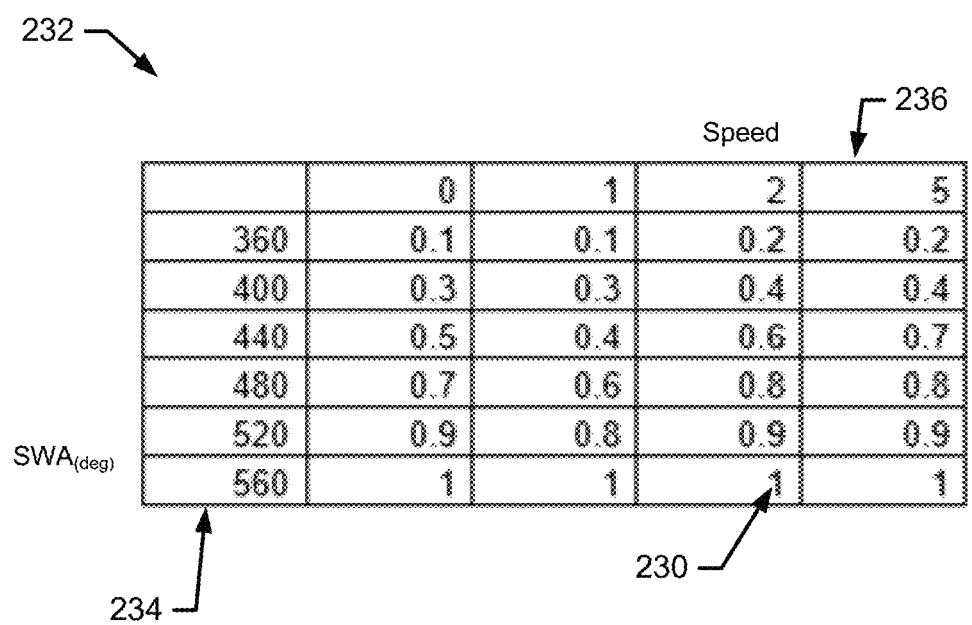
FIG. 3 illustrates a slip table in accordance with an example embodiment.

In an example embodiment, the information upon which the control algorithms operate may include a target slip 230. In this regard, the target slip 230 may be determined by the controller 140 (or torque control module 130) from a slip table 232 based on slip information received from the sensor network 160 and/or the components/subassemblies 150. FIG. 3 illustrates an example of a slip table 232 in accordance with an example embodiment. The slip information may include steering wheel angle 234 and vehicle speed 236. Vehicle speed 236 may be provided from a speedometer of the vehicle 110, from global positioning system (GPS) information, or any other suitable source including detectors capable of measuring wheel speed for each individual one of the wheels of the vehicle 110. The steering wheel angle 234 may be provided by a sensor(s) configured to determine the steering wheel angle 234 directly or indirectly. By entering the slip table 232 with a current measurement for the vehicle speed 236 and the steering wheel angle 234, a corresponding value for the target slip 230 may be determined.

In the example of FIG. 3, the values for the target slip 230 may be determined based on a comparison of inside wheel speed (e.g., for one wheel or both wheels) to the average of the outside wheel speeds (or the average of all other wheel speeds). The values for the target slip 230 are show as a fraction of full slip (or 100% slip, at which the inside wheel (or wheels) are fully stopped) in FIG. 3. Thus, a value of 1 is 100% slip, and a value of 0.5 is 50% slip (e.g., where the speed of the inner wheel is half the speed of the outer wheel (or wheels)).

As can be appreciated from the example of FIG. 3, the slip table 232 may only apply over a limited range of steering wheel angles 234 and values for vehicle speed 236. The automated application of slip-based control of brake-steering may therefore be understood to be based on a combination of the steering wheel angle 234 and the vehicle speed 236 both being within respective applicable ranges. Thus, for example, a trigger event for initiation of brake-steering may be seen as a recognition (e.g., by the controller 140 or the torque control module 130) of a situation in which both the steering wheel angle 234 and the vehicle speed 236 are within the respective applicable ranges. In some cases, the trigger event may further include recognition of one or more preconditions also being met. The preconditions may include the vehicle 110 being in the off-road driver assistance mode and/or a state of the differential being disengaged.

The applicable range for steering wheel angle 234 may be a range of values proximate to the extreme limit of the steering wheel angle 234. In the example of FIG. 3, it may be assumed that the extreme limit of the steering wheel angle 234 is 590 degrees. Meanwhile, the range of applicable values extends over 90 degrees (and therefore the last 90 degrees from 500 to 590 degrees). However, other values for the applicable range and/or the extreme limit could be used for different vehicles.

The applicable range of the vehicle speed 236 may also include only a range of speeds starting at zero and extending to a limit of speeds (e.g., in miles per hour or meters per second) at which the off-road driver assistance mode may be employed. In the example of FIG. 3, the range of the vehicle speed 236 extends from 0 to 5 m/s. Moreover, as shown in the example of FIG. 3, the inside wheel (or wheels) may be stopped completely at low speeds and high values for the steering wheel angle 234. However, the inside wheel (or wheels) may not be stoppable completely at higher speeds, even at the highest values for the steering wheel angle 234. It should also be appreciated that the slip table 232 of FIG. 3 is merely one example, and other ranges and values for both wheel angle and speed could be employed in other examples without limitation.

Returning to FIG. 2, when in the off-road driver assistance mode, the controller 140 may reference the slip table 232 with current values measured for the steering wheel angle 234 and the vehicle speed 236 in order to determine the target slip 230. The target slip 230 may then be provided to the torque control module 130 along with a measurement or value for current slip 238. The torque control module 130 may compare the target slip 230 to the current slip 238 to determine a slip error 240. Notably, without any application of braking force being applied to the inside wheel (or wheels), the expectation is that the target slip 230 will be higher than the current slip 238. As such, the slip error 240 will typically define a deficit for the current slip 238 relative to the target slip 230.

The torque control module 130 may be configured to provide a braking torque 242 based on the slip error 240. The braking torque 242 may be defined from a braking table 244 used by the torque control module 130 to define the braking torque 242 that is to be applied to one (or both) of the inside wheels of a braking system 250 of the vehicle 110. As noted above, the braking system 250 may include friction brakes or electrical methods of braking. In either case, the braking torque 242 may determine a brake pressure to be applied to the inside wheel (or wheels).

The braking table 244 may be used to define when and how much braking should be applied (e.g., as the braking torque 242) based on the slip error 240. In some cases, the braking table 244 may be determined based on specific structural information associated with the vehicle 110 (e.g., model-specific parameters such as track width, wheel base, maximum road wheel angle, etc.). The braking table 244 may also, in some cases, include or be modified by additional information such as correction factors 252. The correction factors 252 may include yaw rate, propulsive axle torque, driveline state, etc.

In an example embodiment, the slip error 240 and the correction factors 252 (if any) may be used to reference the braking table 244 and determine the braking torque 242. The braking table 244 may define the braking torque 242 as a fixed value or a dynamic value. In some cases, the braking torque 242 may be defined as a step function, a ramp function, or as a combination of step and ramp function components that may apply over respective different periods of time over which the braking torque 242 is applied. Magnitude and rates for the step and ramp functions that define the braking toque 242 may be determined one a model-by-model basis, and may be calibratable. Ramp rates may also be separately calibratable for rising versus falling pressure ramps (e.g., such that different rates apply and are calibrated for rising ramps than for falling ramps).

As can be appreciated from the description above, the torque control module 130 may be configured to apply the braking torque 242 in order to attempt to drive the slip error 240 to zero. As such, the torque control module 130 may be configured to execute a feedback loop for controlling slip (e.g., to match target slip 230 and current slip 238) via the application of the braking torque 242 to an inside wheel (or both inside wheels) during a turn that is conducted within applicable speed and steering wheel angle ranges when preconditions are met. However, in some cases, it may be desirable to further monitor the performance of the torque control module 130 in order to determine whether the torque control module 130 is performing as expected. In other words, it may be desirable to monitor the effectiveness of the torque control module 130 relative to conducting brake-steering in real time, during application of the brake-steering. To the extent the torque control module 130 is not effective, operations of the torque control module 130 may be suspended.

Figure 4:
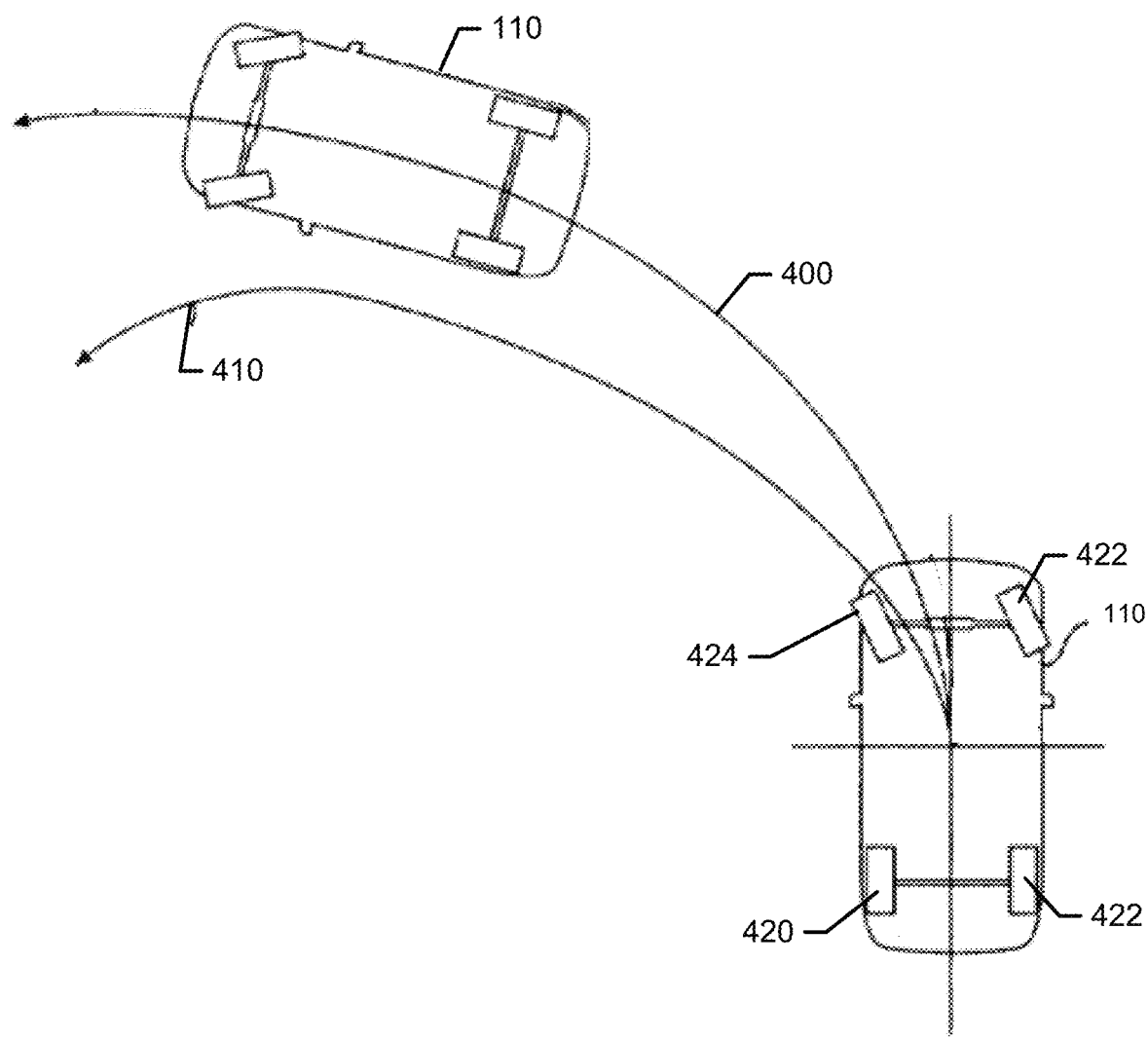
FIG. 4 illustrates a plot of vehicle tracks during a normal turn and during a turn employing brake-steering of an example embodiment.

To handle this monitoring function, the controller 140 may further include or otherwise be in communication with an evaluation module 260. The evaluation module 260 may be configured to determine the effectiveness of the braking torque 242 on achieving desired increases in turning radius. FIG. 4 illustrates an example in which the vehicle 110 is conducting a turn. A normal (unmodified) turn radius 400 is shown for comparison to a modified turn radius 410. The modified turn radius 410 illustrates the expected increase in turn radius that can be expected by applying the braking torque 242 to rear inside wheel 420 during the turn. Of note, slip in this example is determined by comparing the speed of the inside wheel 420 to an average speed of the outside wheels 422 and the front inside wheel 424. For other examples in which the braking torque 242 is applied to the front inside wheel 424 also may define a different target slip for each of the front inside wheel 424 and the rear inside wheel 420 (in both cases comparing the corresponding wheels speed to the average of the other three wheel speeds). However, it may also be possible to simply compare the inside wheel speed to the average of the speeds of the outside wheels 422. The comparisons and calculations used by the evaluation module 260 (and the controller 140 in general) may operate the same regardless of the direction of a turn (although only for forward movement in some cases). Accordingly, information on the direction of the turn may only be needed to enable the evaluation module 260 (and controller 140) to determine which wheels are inside wheels and which wheels are outside wheels for a given turn.

Figure 5:
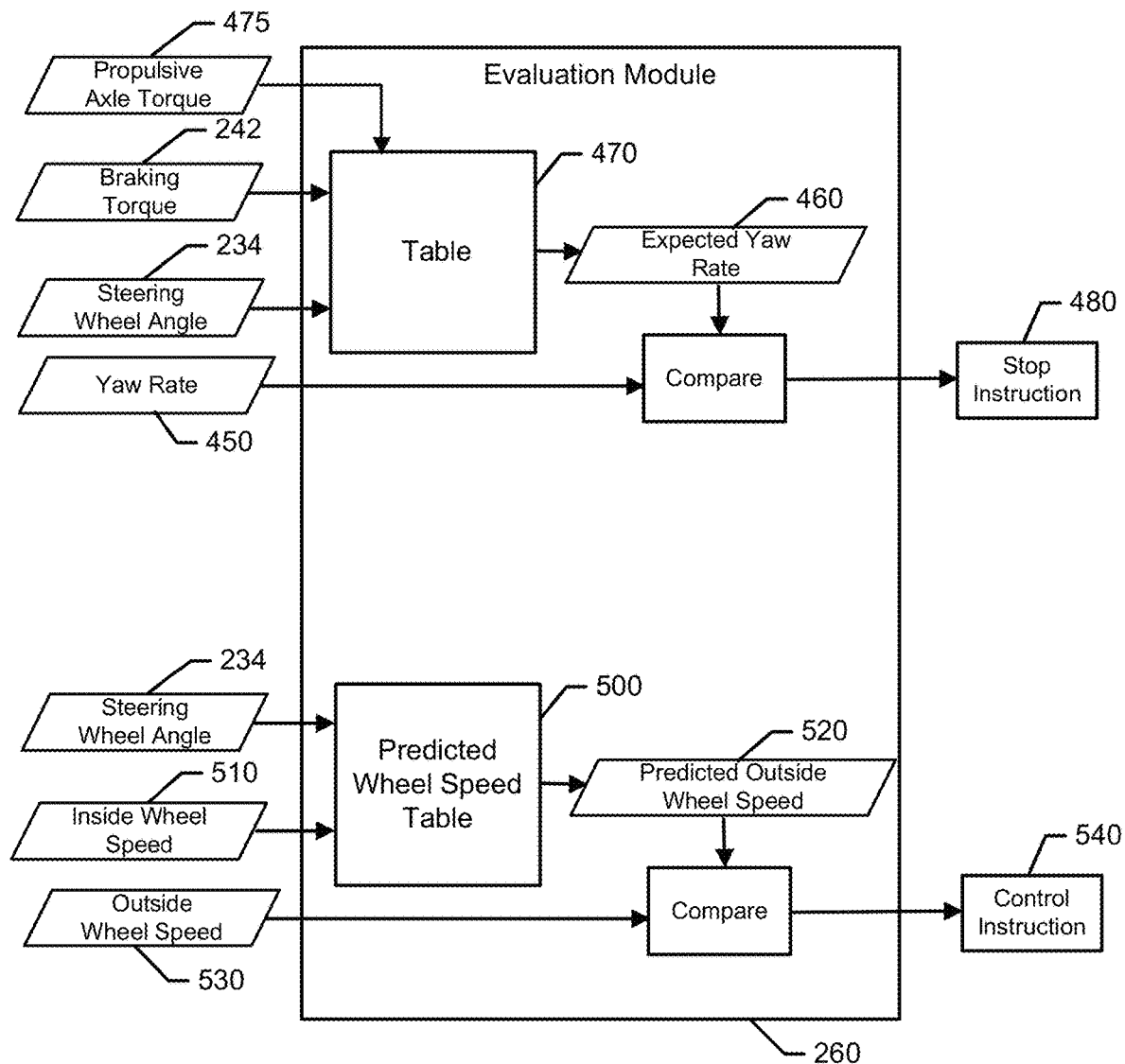
FIG. 5 illustrates a block diagram of an evaluation module in accordance with an example embodiment.

During the turn shown in FIG. 4, the braking torque 242 may be applied in order to attempt to achieve the modified turn radius 410. As can be appreciated from FIG. 4, the vehicle 110 will experience a higher yaw rate for the modified turn radius 410 than for the normal turn radius 400. As such, the yaw rate may be monitored during the turn in order to determine whether the higher yaw rate is actually being experienced, and therefore the expected results are being achieved. The evaluation module 260 of FIG. 2, which is shown in greater detail in FIG. 5, may therefore be configured to receive a yaw rate 450 that is measured during the turn. The yaw rate 450 may be compared to an expected yaw rate 460 (e.g., generated from a table 470) that is determined based on the steering wheel angle 234, the braking torque 242 and the propulsive axle torque 475. To the extent the yaw rate 450 is less than the expected yaw rate 460, it may be the case that the conditions of the vehicle 110, or of the road or trail on which the vehicle 110 is operating, are not conducive to proper operation of the brake-steering function described herein. For example, if the vehicle 110 is stuck or not proceeding forward, brake-steering may neither be possible nor desirable. Similarly, if the operating surface of the vehicle 110 is not conducive to brake-steering, the evaluation module 260 may detect the issue and cause the controller 140 to stop efforts to utilize the torque control module 130 for brake-steering in the manner described above. In this regard, for example, if the yaw rate 450 is not within a predetermined amount or predefined threshold of the yaw rate 460, a stop instruction 480 may be issued by the evaluation module 260 to stop the torque module 130 from continued brake-steering.

As noted above, in some cases preconditions may be required before brake-steering is conducted by the controller 140 and/or torque control module 130. In an example embodiment, one of the preconditions may be detecting the state of the differential 180, and more particularly determining that the differential 180 is disengaged. In an example embodiment, the evaluation module 260 (or another module dedicated to the function) may be configured to also or alternatively determine whether the differential 180 is disengaged prior to allowing brake-steering as described above. In this regard, for example, the evaluation module 260 may include a predicted wheel speed table 500 that is generated for the particular model of the vehicle 110. The predicted wheel speed table 500 can be determined based on a measured inside wheel speed (or speeds) and outside wheel speeds for respective given ranges of steering wheel angles. In this regard, for each vehicle, the vehicle parameters (e.g., steering ratio, wheelbase, track width) will generate corresponding relatively consistent measurements for inside and outside wheels speeds at each steering wheel angle. Once the predicted wheel speed table 500 is formed, as described above, the predicted wheel speed table 500 may be entered with measured steering wheel angle 234 and measured inside wheel speeds 510 in order to generate a predicted outside wheel speed 520. If the predicted outside wheel speed 520 is within a predetermined or threshold amount of the actual outside wheel speed 530, a control instruction 540 to enable the brake-steering described above may be issued. However, if the predicted outside wheel speed 520 is not within the predetermined or threshold amount of the actual outside wheel speed 530, the control instruction 540 may instead disable the brake-steering described above.

To avoid any delays in deciding whether to enable the brake-steering function, the precondition related to state of the differential 180 may be made prior to entering the range of steering wheel angles 234 over which the brake-steering function is active. Thus, whereas in the example above, the range of steering wheel angles 234 over which the brake-steering function is active was 500 to 590 degrees, the precondition may be evaluated prior to 500 degrees. As an example, the evaluation module 260 may be configured to begin calculating the predicted inside wheel speed 520 for comparison to the actual inside wheels speed 530 over range of the steering wheel angles 234 that extends from 450 degrees to 500 degrees. However, other ranges (larger or smaller) could also be used so long as the control instruction 540 can be issued prior to entering the range of 500 to 590 degrees where brake-steering is potentially active.

Figure 6:
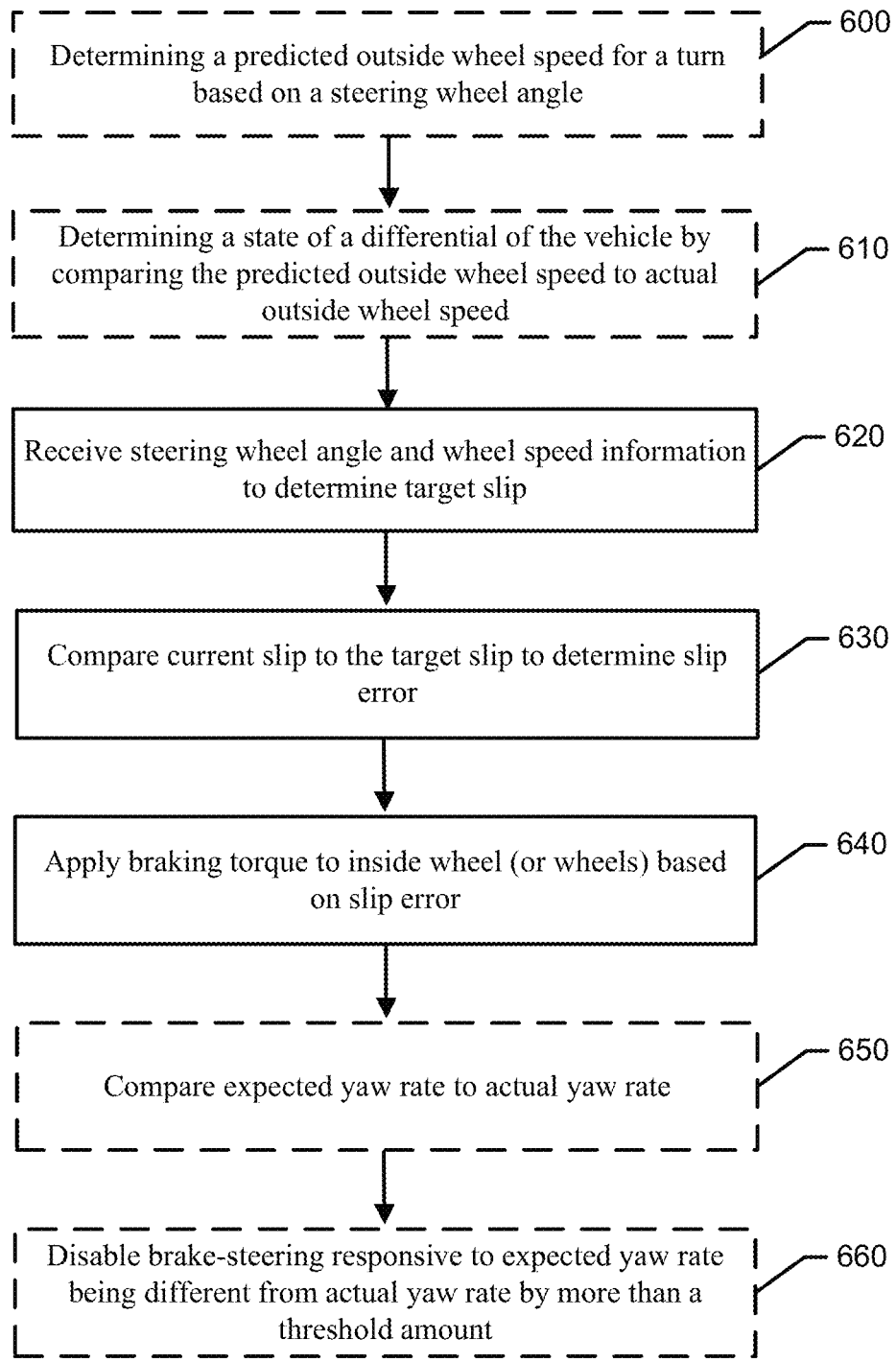
FIG. 6 illustrates a method of controlling a vehicle in accordance with an example embodiment.

FIG. 6 illustrates a block diagram of one example method of providing automated application of turn radius reduction in a driver assist mode may include receiving steering wheel angle and wheel speed information to determine a target wheel slip during a turn at operation 620. The method may further include comparing the target wheel slip to a current wheel slip to determine a slip error at operation 630, and applying braking torque to an inside wheel based on the slip error to reduce the turn radius at operation 640. The method may include optional additional operations in some cases, some examples of which are shown in dashed lines in FIG. 6. Thus, for example, the method may include an initial operation of determining a predicted outside wheel speed for a turn based on a steering wheel angle at operation 600, and determining a state of a differential of the vehicle by comparing the predicted outside wheel speed to actual outside wheel speed at operation 610. Notably, in some examples, applying the braking torque in operation 640 may only enabled if the state of the differential is disengaged. In some cases, applying the braking torque may further only be enabled over a first range of steering wheel angles. The first range of steering wheel angles may extend from a starting angle to a maximum angle that corresponds to a limit of rotation of the steering wheel. In such an example, determining the state of the differential may be performed over a second range of steering wheel angles. The second range of steering wheel angles may be entirely less than the starting angle. In some cases, the method may also or alternatively further include comparing an expected yaw rate for the turn to an actual yaw rate at operation 650, and disabling the applying the braking torque responsive to the expected yaw rate being different from the actual yaw rate by more than a threshold amount at operation 660.

Example embodiments may therefore also include a vehicle control system, which may include a controller and a torque control module. The controller may be operably coupled to components and/or sensors of a vehicle to receive information including vehicle wheel speed and steering wheel angle. The controller may be configured to determine a target wheel slip for a turn based on the information. The torque control module may be configured to compare the target wheel slip to a current wheel slip and control application of braking torque to an inside wheel during the turn to reduce the turn radius based on a difference between the current wheel slip and the target wheel slip.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the controller may be configured to control vehicle operation in any of a plurality of operator selectable modes of operation, and the torque control module may be configured to apply the braking torque during the turn responsive to operator selection of a corresponding one of the modes of operation and detection of a trigger event. In an example embodiment, the trigger event may include detecting the steering wheel angle being within a first range of steering wheel angles and the vehicle speed being within an enabling range of vehicle speeds. The first range of steering wheel angles may extend from a starting angle to a maximum angle that corresponds to a limit of rotation of the steering wheel. The controller may be configured to evaluate effectiveness of applying of the braking torque on reducing the turn radius during the turn. In this regard, for example, the controller may be configured to determine an expected yaw rate for the turn and compare the expected yaw rate to a current yaw rate. Evaluating the effectiveness of the applying the braking torque may further include generating a stop instruction to stop the applying the braking torque responsive to a difference between the expected yaw rate and the current yaw rate being greater than a predefined threshold. In an example embodiment, the controller may be configured to determine a state of a differential of the vehicle during the turn, and applying the braking torque may be enabled or disabled based on the state of the differential. In some cases, determining the state of the differential may include determining a predicted outside wheel speed for the turn based on the steering wheel angle and the inside wheel speed, and comparing the predicted outside wheel speed to an actual outside wheel speed. In an example embodiment, determining the state of the differential may be performed over a second range of steering wheel angles, and the second range of steering wheel angles may be entirely less than the first range of steering wheel angles. In some cases, applying the braking torque may include applying the braking torque as a step function, a ramp function, or a combination of the step function and the ramp function. Ramp rates defining rising versus falling ramps for the application of the braking torque may be individually calibratable, and may be fixed or variable rates. In an example embodiment, the current wheel slip and the target wheel slip may each be defined based on comparing an inside rear wheel speed to an average of outside wheel speeds or an average of all other wheel speeds. In some cases, the braking torque may be applied only to a rear inside wheel during the turn.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system for adjusting turn radius of a vehicle, the system comprising:
   a controller configured to:
      receive, from components and/or sensors of the vehicle in association with a turn, a vehicle wheel speed and a steering wheel angle;
      determine a state of a differential of the vehicle;
      determine a target wheel slip for the turn by applying the received vehicle wheel speed and the received steering wheel angle to a predefined range of vehicle wheel speeds and a predefined range of steering wheel angle for the vehicle; and
      determine a current wheel slip for the turn based on an inner wheel speed indication for an inner wheel to the turn and an outer wheel speed indication for an outer wheel of the turn; and
   wherein the controller is configured to implement a torque control module, the torque control module being configured to:
      determine vehicle preconditions for initiating brake-steering, the vehicle preconditions comprising the state of the differential;
      determine a difference between the current wheel slip and the target wheel slip; and
      control a brake for the inner wheel to apply a braking torque to the inner wheel for performing brake-steering based on the vehicle preconditions and the difference between the current wheel slip and the target wheel slip.

2. The vehicle control system of claim 1, further comprising a user interface, the user interface comprising a vehicle mode selector that enables a user to select one of a plurality of vehicle operation modes;
   wherein the controller is configured to receive a mode selection from the vehicle mode selector in response to user interaction with the vehicle mode selector;
   wherein the vehicle preconditions further comprise the mode selection.

3. The vehicle control system of claim 2, wherein the user interface comprises an interactive display; and
   wherein the vehicle mode selector is a soft switch provided on the interactive display.

4. The vehicle control system of claim 1, wherein the torque control module is configured to prevent initiation of brake-steering when the state of the differential is engaged.

5. The vehicle control system of claim 1, wherein the torque control module is configured to:
   determine an updated difference between an updated current wheel slip and the target wheel slip; and
   modify control of the brake on the inside wheel to apply an updated braking torque to reduce the updated difference between the updated current wheel slip and the target wheel slip.

6. The vehicle control system of claim 5, wherein the torque control module is configured to modify control of the brake on the inside wheel to reduce the updated difference to zero.

7. The vehicle control system of claim 1, wherein controller is configured to implement a feedback loop based on an updated difference between an updated current wheel slip and the target wheel slip;
wherein, within the feedback loop:
the controller is configured to determine an updated current wheel slip for the turn based on an updated inner wheel speed indication for the inner wheel and the outer wheel speed indication; and
the controller is configured to implement the torque control module which is configured to:
determine an updated difference between an updated current wheel slip and the target wheel slip; and
modify control of the brake for the inner wheel based on the updated difference.

8. The vehicle control system of claim 1, wherein the vehicle preconditions further comprise a first determination of whether a current vehicle wheel speed is within the predefined range of vehicle wheel speeds and a second determination of whether a current steering wheel angle is within the predefined range of steering wheel angles.

9. The vehicle control system of claim 1, wherein the torque control module is configured to detect a trigger event for initiating brake-steering in response to the steering wheel angle being within the predefined range of vehicle wheel speeds and the steering wheel angle being with the predefined range of steering wheel angles.

10. The vehicle control system of claim 1, wherein the controller is further configured to:
determine an expected yaw rate for the turn and compare the expected yaw rate to a current yaw rate; and
generate a stop instruction to stop the applying the braking torque responsive to a difference between the expected yaw rate and the current yaw rate being greater than a predefined threshold.

11. A vehicle control system for adjusting turn radius of a vehicle, the system comprising:
a controller configured to:
receive, from components and/or sensors of the vehicle in association with a turn, a vehicle wheel speed and a steering wheel angle;
determine a target wheel slip for the turn by applying the received vehicle wheel speed and the received steering wheel angle to a predefined range of vehicle wheel speeds and a predefined range of steering wheel angles for the vehicle; and
determine a current wheel slip for the turn based on an inner wheel speed indication for an inner wheel to the turn and an outer wheel speed indication for an outer wheel of the turn; and
wherein the controller is configured to implement a torque control module, be torque control module being configured to:
determine a difference between the current wheel slip and the target wheel slip; and
modify control of a brake for the inside wheel to apply a modified braking torque to reduce the difference between the current wheel slip and the target wheel slip.

12. The vehicle control system of claim 11, wherein the torque control module is configured to modify control of the brake on the inside wheel to reduce the updated difference to zero.

13. The vehicle control system of claim 11, wherein the controller is further configured to determine a state of a differential of the vehicle; and
wherein the torque control module is configured to determine the vehicle preconditions, the vehicle preconditions comprising the state of the differential.

14. The vehicle control system of claim 13, further comprising a user interface, the user interface comprising a vehicle mode selector that enables a user to select one of a plurality of vehicle operation modes;
wherein the controller is configured to receive a mode selection from the vehicle mode selector in response to user interaction with the vehicle mode selector;
wherein the vehicle preconditions further comprise the mode selection.

15. The vehicle control system of claim 13, wherein the torque control module is configured to prevent initiation of brake-steering when the state of the differential is engaged.

16. The vehicle control system of claim 11, wherein controller and the torque control module are configured to implement a feedback loop, based on the difference between the current wheel slip and the target wheel slip, to repeatedly determine the current wheel slip, determine the difference between the current wheel slip and the target wheel slip, and modify control of a brake.

17. A vehicle control system comprising:
a plurality of sensors; and
a controller configured to:
receive a vehicle wheel speed during a vehicle turn from a first sensor of the plurality of sensors;
receive a steering wheel angle during the vehicle turn from a second sensor of the plurality of sensors;
determine a target wheel slip for the turn by applying the received vehicle wheel speed and the received steering wheel angle to a predefined relation vehicle wheel speeds and a predefined range of steering wheel angles for the vehicle; and
determine a current wheel slip for the turn based on an inner wheel speed indication for an inner wheel to the turn and an outer wheel speed indication for an outer wheel of the turn;
determine a slip error based on the current wheel slip and the target wheel slip; and
modify control of a brake for the inside wheel to apply a modified braking torque to adjust the slip error during the turn.

18. The vehicle control system of claim 17, wherein the controller is configured to modify control of the brake to adjust the slip error to zero.

19. The vehicle control system of claim 18, wherein the controller is further configured to discontinue modifying control of the brake to adjust the slip error in response to the received steering wheel angle moving out of the predefined range vehicle wheel speeds and the predefined range of the steering wheel angles for the vehicle.

* * * * *

UNITED STATES PATENT AND TRADEMARK OFFICE
CERTIFICATE OF CORRECTION

| | |
|---|---|
| PATENT NO. | : 12,172,632 B2 |
| APPLICATION NO. | : 18/196540 |
| DATED | : December 24, 2024 |
| INVENTOR(S) | : Kevin Sallee et al. |

Page 1 of 1

It is certified that error appears in the above-identified patent and that said Letters Patent is hereby corrected as shown below:

In the Claims

In Column 12, Claim 1, Line 21, "wheel angle" should read as -- wheel angles --

In Column 13, Claim 11, Line 53, "be torque control" should read as -- the torque control --

In Column 14, Claim 16, Line 25, "to repeatedly determine" should read as -- to determine --

In Column 14, Claim 17, Line 38, "predefined relation" should read as -- predefined range of --

In Column 14, Claim 17, Line 40, "vehicle; and" should read as -- vehicle; --

Signed and Sealed this
Fifteenth Day of April, 2025

Coke Morgan Stewart
*Acting Director of the United States Patent and Trademark Office*